United States Patent [19]

Stratman et al.

[11] Patent Number: 4,813,809
[45] Date of Patent: Mar. 21, 1989

[54] JOINT ASSEMBLY FOR TRANSFORMER PARTS

[75] Inventors: Dennis L. Stratman, Kansas City; Steven P. Lowry, Holts Summit, both of Mo.

[73] Assignee: Westinghouse Electric Corp., Pittsburgh, Pa.

[21] Appl. No.: 134,721

[22] Filed: Dec. 18, 1987

[51] Int. Cl.⁴ ................................................ B25G 3/00
[52] U.S. Cl. .............................. 403/405.1; 312/140.3; 248/500; 403/407.1
[58] Field of Search .................. 403/387, 407.1, 405.1; 312/140.3, 140.4; 248/500, 503, 507

[56] References Cited

U.S. PATENT DOCUMENTS

| | | | |
|---|---|---|---|
| 3,053,601 | 9/1962 | Korling | 312/140.3 |
| 3,524,666 | 8/1970 | Schilf et al. | 403/387 |
| 4,264,113 | 4/1981 | Suttles | 312/140.3 |
| 4,408,928 | 10/1983 | Steinke | 403/387 X |
| 4,473,316 | 9/1984 | Welch | 403/407.1 |

*Primary Examiner*—James T. McCall
*Attorney, Agent, or Firm*—M. J. Moran

[57] ABSTRACT

A joint assembly between a tank and a base of a transformer and characterized by a clamping joint including a mounting bracket, a clip, and a bolt-nut assembly. The tank and base having adjacent inturned surfaces to be assembled by a clamping joint having a mounting bracket, a clip, and a nut-bolt assembly. The bracket is a channel member mounted on the tank inturned surface and having a web spaced therefrom. The clip having one end portion in clamping engagement with the base inturned surface and having another end portion pivotally mounted on the bracket. The bolt extending through aligned holes in the web and other end portion where the bolt is retained by the nut so as to clamp the inturned surfaces together.

7 Claims, 1 Drawing Sheet

JOINT ASSEMBLY FOR TRANSFORMER PARTS

BACKGROUND OF THE INVENTION

1. Field of the Invention

This invention relates to an attachment clamp for securing a transformer base to a transformer tank.

2. Description of the Prior Art

Although a common method of joining transformer tanks and transformer bases together heretofore has been welding, other methods have included the use of bolts, hold-down clips, and cleats clamping over a flange of the base. Several disadvantages incurred by these methods have included handling problems during subsequent manufacturing procedures, additional costs, and appearance.

Moreover, clamping assemblies for mounting structures together other than electrical devices are disclosed in U.S. Pat. Nos. 1,606,509; 1,761,004; 2,130,546; 2,175,453; 2,932,036; 2,996,730; and 3,851,849. The disclosures of these patents are adapted more particularly for the specific structures disclosed, such as floor construction, display cases, sink mounting devices, and the like, in which relatively thick frame members, such as wood, are involved, or a mounting bolt extends through a surface which is not compatible with transformer tanks.

SUMMARY OF THE INVENTION

In accordance with this invention, it has been found that a joint assembly is provided between a transformer base and a transformer tank, the base having an outer surface and an inturned flange, the tank having a front panel aligned with the outer surface and having an inturned bottom wall, a clamping joint including a mounting bracket, a clip, and a bolt; the mounting bracket being a channel member and having a web spaced from a bottom wall of the tank and having a first bolt-receiving hole, the clip comprising two portions extending at an obtuse angle with the angle facing the bracket and having a second bolt-receiving hole between opposite end portions, one end portion of the clip being disposed on the flange and the other end portion being pivotally disposed on the bracket, the bolt extending through the aligned first and second holes, and having a nut for tightening and holding the bolt in place, and a gasket disposed between the flange and the bottom wall.

The advantage of the clamping joint of this invention is that it is conductive to a fast, secure method of attaching the base and the tank, and enables adjustment for minor disalignment of the mating surfaces of the tank front panel and the base outer surface.

DESCRIPTION OF THE PREFERRED EMBODIMENT

Figure 1:
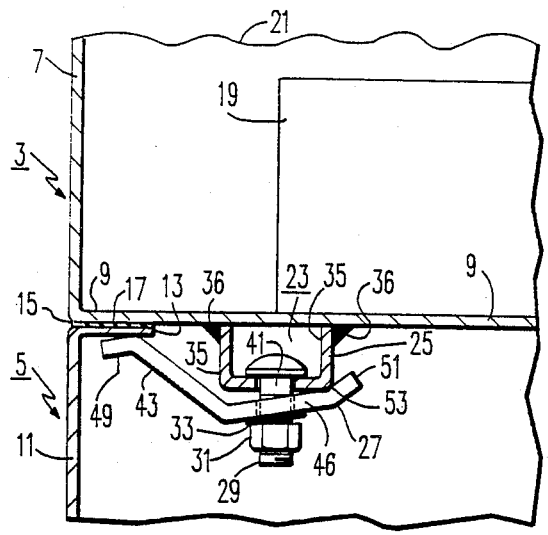
FIG. 1 is a sectional view through adjacent corners of a transformer tank and a transformer base showing a clamping joint in accordance with this invention.

In FIG. 1 a portion of a transformer tank generally is indicated at 3 and a portion of a transformer base is generally indicated at 5. The transformer tank includes a front panel 7 and an inturned surface or bottom wall 9. The transformer base 5 includes an outer surface 11 and an inturned flange 13. A joint assembly 15 is disposed between the bottom wall 9 and the inturned flange 13 and a gasket 17 of suitable material, such as foam rubber, is disposed in the joint assembly. The transformer tank 3 contains a conventional transformer unit 19. The unit is submerged within a dielectric or cooling liquid having a liquid level 21.

In accordance with this invention, a joint assembly, generally indicated at 23, comprises a mounting bracket 25, a clip 27, and a bolt 29 having a nut 31. A washer 33 is preferably disposed between the nut 31 and the clip 27.

Figure 2:
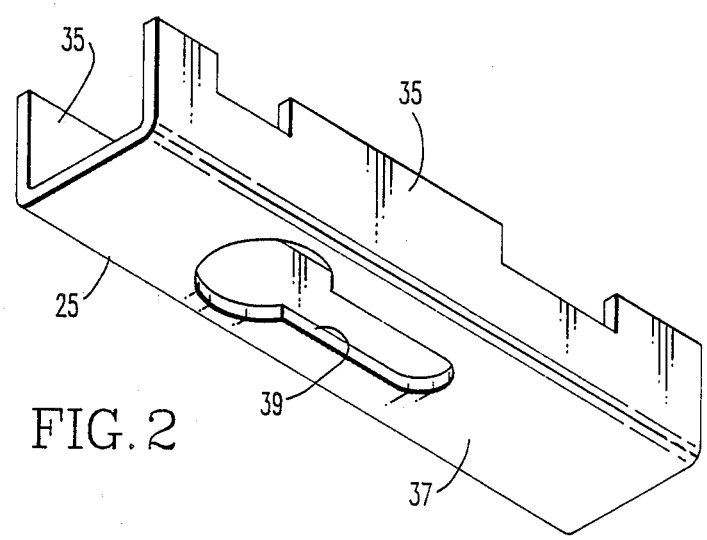
FIG. 2 is an isometric view of the mounting bracket of the clamping joint.

As shown in FIG. 2, the mounting bracket 25 is a channel shaped member having spaced legs or flanges 35 and a web 37. The edges of the flanges 35 are secured at 36 to the under surface of the bottom wall 9 of the tank in a suitable manner, such as by welds, and at a location spaced inwardly from the inturned flange 13 of the base 5. A keyhole or slot 39 is provided in the web for insertion of the bolt 29 which is preferably a carriage bolt. The bolt 29 includes a rectangular shank portion 41 which fits into the narrow portion of the slot 39 to prevent rotation thereof when the nut 31 is applied. The clip 27 is comprised of two portions 43, 46 which are disposed at an obtuse angle with respect to each other. In addition, the clip portion 43 may be provided with an outturned end segment 49 and the clip portion 46 may have an outturned end segment 51.

It should be understood that although a single mounting bracket 25 and clip 27 has been described in detail, that in fact, depending on the transformer size, four or more clamping devices will be used to secure a transformer base to a transformer tank, and such bracket and clip combinations will be substantially equidistantly spaced about the underside.

As shown in FIG. 1 the bolt 29 extends through the slot 39 and an aligned hole (not shown) in the clip 27 with the nut 31 tightened in place against the clip 27. The clip 27 serves as a clamping lever which is pivoted on the bracket 25 at 53 so that with increased tightening of the nut, the end segment 49 of the clip clamps the inturned flange 13 tightly against the bottom wall 9 to form the clamped joint assembly 15. In this manner, the front panel 7 and the outer surface 11 of the transformer tank 3 and the transformer base 5 are retained in alignment with each other.

In conclusion, the joint assembly of this invention, provides an improved method of attaching a transformer tank to a transformer base with improved corrosion resistance because the base and tank may be painted separately before assembly. In addition, the joint assembly provides for a method for compensating for minor misalignments with mating surfaces and is an expedient method for making such an assembly. Furthermore, bases of different heights can be utilized in connection with a standard transformer tank to provide different, or changeable tank heights with respect to the conventional concrete mounting pad.

We claim:

1. In a joint assembly between a transformer base and a transformer tank, the base having an outer surface and an inturned flange and the tank having a front panel and an inturned surface, the combination with the flange and inturned surface of a clamping joint including a mounting bracket, a clip, and a bolt; the mounting bracket being secured to the inturned surface and having a first bolt-receiving hole; the clip having a second bolt-receiving hole between opposite end portions thereof with one end portion disposed on the flange and the other end portion pivotally disposed on the bracket; and the bolt extending through the aligned first and second holes and holding said one end portion in increasing clamping engagement with the flange as the bolt is increasingly tightened in place.

2. The joint assembly of claim 1 in which the transformer base and tank are comprised of sheet-like material.

3. The joint assembly of claim 2 in which the inturned surface comprises the bottom wall of the tank and the mounting bracket is a channel member having a web spaced from the bottom wall and comprising the first hole.

4. The joint assembly of claim 3 in which the clip is comprised of two portions extending at an obtuse angle with the angle facing the bracket.

5. The joint assembly of claim 4 in which the bolt includes a nut.

6. The joint assembly of claim 5 in which a gasket is disposed between the flange and the bottom wall.

7. The improved joint between a transfomer tank and a transformer base, said transformer tank including a bottom wall and said transformer base including an internal flange on the upper edge thereof, said internal flange in mating engagement with said bottom wall of said tank;
  a plurality of channel-shaped mounting brackets secured to the bottom wall of said tank adjacent the edges thereof, said mounting brackets having an aperture therethrough;
  bolt means; and
  a clamping member having a pair of leg portions bolted to each of said mounting brackets through said aperture in said mounting bracket by said bolt means, one of said leg portions of each of said clamping members clamping said flange to said bottom wall while the other of said leg portion is in pivotal contact with said bracket, said bolt means interposed between said leg portions to thereby impart an increasing clamping force to said flange through said one of said leg portions of each of said clamping member as the bolt means is tightened in place.

* * * * *